UNITED STATES PATENT OFFICE.

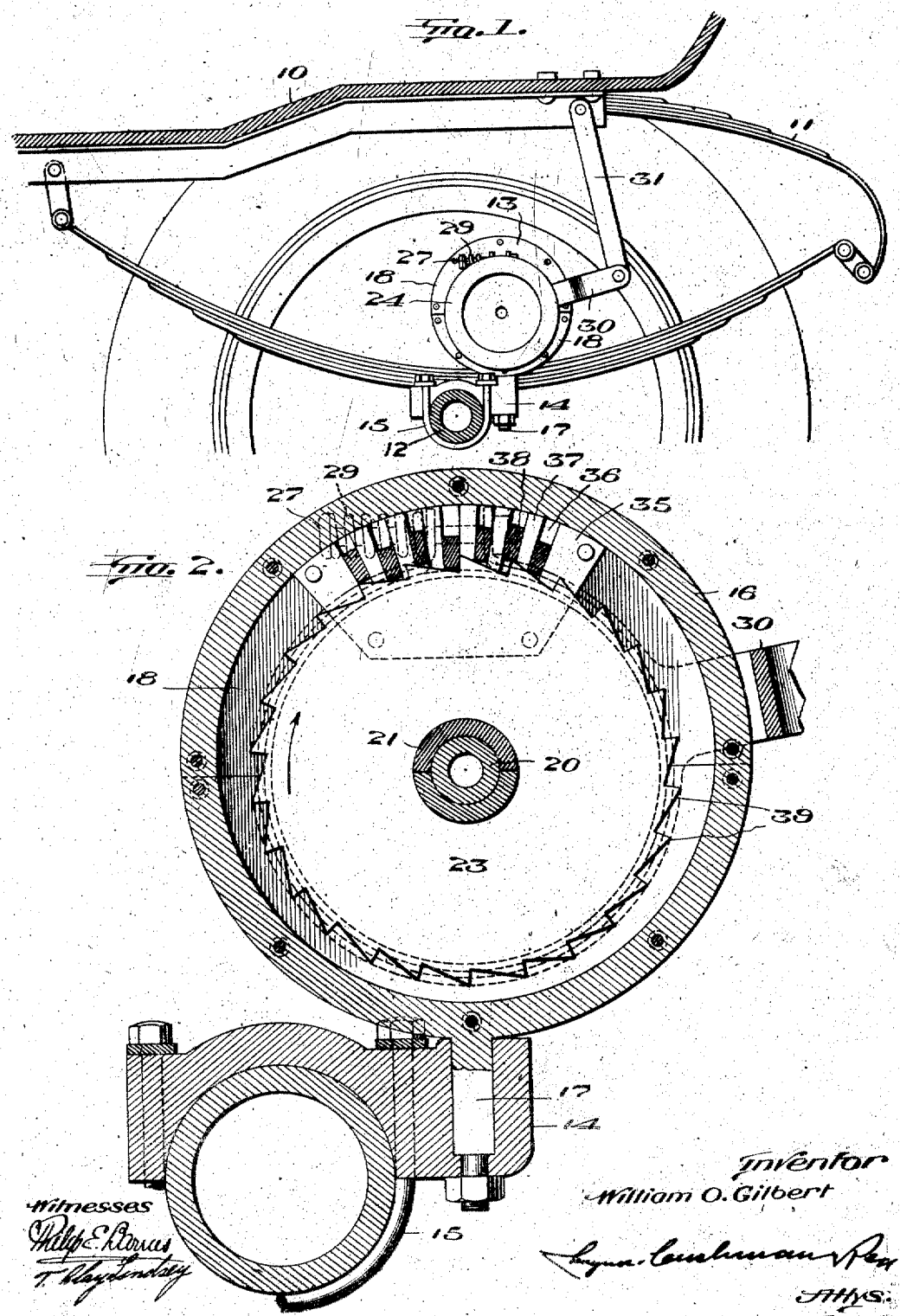

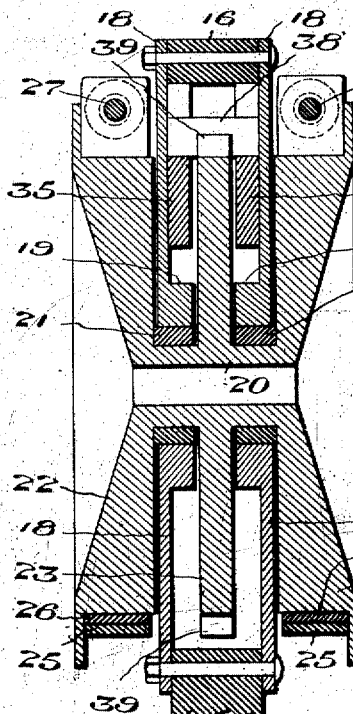
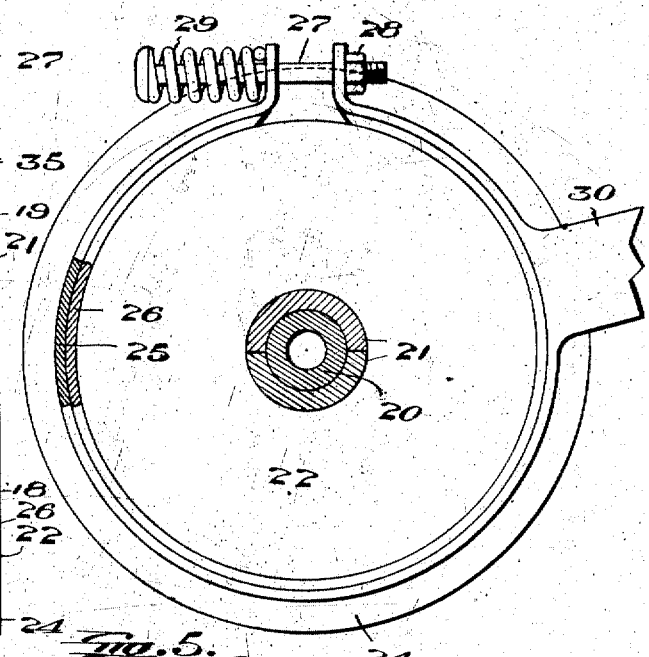
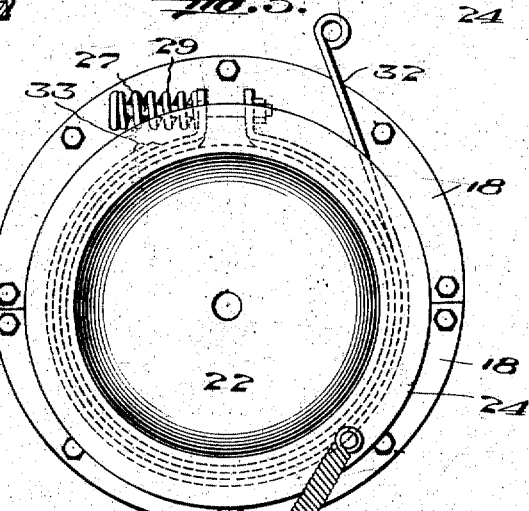
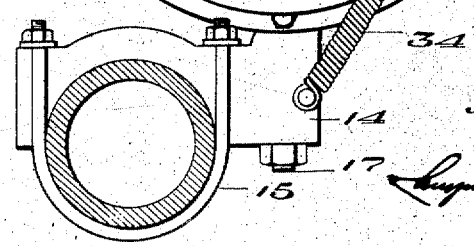

WILLIAM O. GILBERT, OF OMAHA, NEBRASKA.

SHOCK-ABSORBER.

1,254,675.  Specification of Letters Patent.  Patented Jan. 29, 1918.

Original application filed June 9, 1916, Serial No. 102,635. Divided and this application filed October 14, 1916. Serial No. 125,540.

*To all whom it may concern:*

Be it known that I, WILLIAM O. GILBERT, a citizen of the United States, residing at Omaha, in the county of Douglas and State of Nebraska, have invented new and useful Improvements in Shock-Absorbers, of which the following is a specification.

The present invention relates to shock absorbers which are now commonly used in connection with automobiles, and the purpose of which is to eliminate the sudden rebound (and resultant discomfort to passengers) of a flexed spring by retarding the action of the spring, so that its return, instead of being sudden, will be gradual and shock to the body of the vehicle and the occupants thereof will be prevented.

In the improvement which I have developed, and which will be hereinafter described, the construction is such that there is no interference with the flexing of the spring under its load, it being free to yield downwardly without any appreciable retardation, so that its full resiliency under the load is utilized, but the spring on its upward movement will be retarded; and the improvement is such that this retardation will be effective upon the slightest flexing and return of the spring, although the device, which I shall now describe in detail, having reference to the drawings which accompany and form a part of this disclosure, will be equally effective in retarding the return of the spring from the limit of its flexed position. In other words, the action of the shock absorber is only during that period when retardation is desirable, and is effective from the minimum degree of flexure of the spring to a maximum movement thereof.

This application is a division of application for Letters Patent filed by me the 9th day of June, 1916, Serial No. 102,635.

In the drawings,—

Figure 1 shows one embodiment of my improved shock absorber in elevation together with so much of a vehicle body and a spring of a not unusual type as will serve to illustrate the application of my invention.

Fig. 2 is a vertical sectional view, on a larger scale than that of Fig. 1, of the shock absorber.

Fig. 3 is a vertical sectional view taken at right angles to the line of section of Fig. 2.

Fig. 4 is an inside view of one of the friction disks showing the brake band in position about its periphery.

Fig. 5 is a side elevational view of my improved shock absorber showing a slightly different form of connection between the absorber and the relatively movable part of the vehicle.

Referring to the drawings by numerals, like numerals indicating like parts in the several views, 10 designates a portion of a vehicle body, 11 a spring of the semi-elliptic type applied thereto, and 12 shows conventionally an axle.

Secured to one of the spring-connected parts (vehicle body or running gear) but preferably to a stationary part of the running gear, either the axle (as shown in the present case) or to any other convenient part, is a casing 13, of any suitable form, said casing being mounted on a saddle or other appropriately formed part 14 seated upon the axle, suitable securing means, as clips 15 or other appropriate devices, being provided to secure the saddle 14 fixedly to that part of the running gear on which it is mounted, the only necessity being that the casing 13 carried by the saddle 14, together with its contained retarding mechanism, be so mounted with respect to the spring 11 that the spring will be effectively retarded on its upward throw or movement after the same has been flexed.

Any convenient form of saddle or support may be used, but that herein disclosed is substantially T-shaped, the body-portion resting on the axle to which it is secured by the clips 15, one at each end, the central leg of the T forming the point of attachment for the casing 13 and its associated parts.

The said casing 13 comprises a central ring-like member 16, provided with a radially-projecting standard 17 which fits a suitable aperture or socket in the central leg of the bracket 14, as shown in Fig. 2, in which it may be secured in any suitable manner, as by a nut threaded to the end of the standard, as shown.

Secured to said ring-shaped frame 13 are plates 18 which inclose the ratchet and pawl mechanism, hereinafter described, each of said plates being formed in two parts, which together form a circular disk, but which are of unequal area, the line of division between the plates being a chord so as to give unequal segments, the upper one of which is the larger. The plates 18 have journal bearings preferably formed by thickening the plates at 19, to provide a bearing for a shaft 20 which may be hollow, as shown, and preferably suitable anti-friction bearing elements 21 will be interposed between the bearings 19 and the shaft 20, as shown in Fig. 3.

Formed integrally with said shaft 20, as shown in Fig. 3, are disks 22, said disks lying outside of the side plates 18 heretofore described and forming one of the friction elements of the device. If desired, the disks 22 may be made separate of the shaft 20 and secured thereto in any suitable manner.

The said shaft 20 has also, integral therewith or separate and suitably secured thereto, a centrally disposed ratchet wheel 23 which, together with the pawl mechanism presently to be described, is effective to initiate the retarding action of the absorber.

Each of the disks 22 is relatively broad at its periphery thereby providing a surface of sufficient width to receive an ordinary brake band retained upon the periphery of the disk by means of a peripheral retaining flange 24 extending outwardly from the outer edge of the disk. The brake band, in the present instance, comprises a metallic band 25 lined with a strip 26 of leather or other suitable friction material, but, of course, it may be of any approved construction. The opposite ends of the metallic band 25 are tied together by means of a bolt 27 having a nut 28 threaded upon one of its ends. A tensioning spring 29 is coiled about one end of the bolt and engages at one end against the head of the bolt, and at the other against the metallic band, and this tensioning spring is adjusted to resiliently hold the brake band in close contact with the periphery of the disk 22, the tension of the spring 29 being varied by means of the nut 28.

In Figs. 1, 2 and 4, I have shown the metallic portions 25 of the brake band as having arms 30 which may be integral with the brake bands or secured thereto in any suitable manner, and the outer ends of the arms 30 are coupled by a link 31 to either the vehicle body or chassis, so as to give a pivotal connection between the arms 30 of the shock absorber and the relatively movable vehicle.

In Fig. 5, I have shown the brake bands as connected to the body portion of the vehicle by means of straps 32 of any suitable material which encircle the brake bands and are connected thereto as at 33. A coil spring 34 is connected at one end to one of the disks 22 and at its other end to the bracket 14 for the purpose of wrapping the straps 32 about the brake bands upon a downward movement of the vehicle body 10 and the flexing of the spring 11.

The upper sections of the plate 18 heretofore referred to, are provided with plates 35, preferably of truncated wedge form, which plates 35 may be integrally formed with the plates 18 or separate and suitably secured thereto, said plates being of considerable thickness and provided with radiating slots 36 forming pawl seats, the said slots being separated from one another by partitions 37, the thickness of which partitions is preferably equal to the width of the pawl seats. The said plates 35 are placed opposite each other and form seats for a series of bars 38 which are free to move in and out of said slots 36. The said bars 38 form pawls adapted to automatically engage the teeth 39 on the ratchet wheel 23 as best shown in Fig. 2. It will be observed that the inclination of the pawl seats 36 is such that the pawls 38 will by gravity tend to fall or slide downwardly, thus insuring constant engagement of the pawls with the teeth of the ratchet wheel 23.

It is obvious, of course, that the pawls 38 would be equally effective if arranged at any other position, and provided with means such as springs, or other suitable means to impel them forwardly and hold them against the ratcheted periphery of the friction member 23, but I prefer the arrangement herein disclosed, for the reason that springs are eliminated, and that the pawls are controlled by gravity.

With the construction shown in Figs. 1 to 4, it will be obvious that when rotating movement is given to the brake bands 25, by a downward movement of the vehicle body 10 and flexing of the spring 11, through the medium of the connecting link 31 and the arms 30, the said brake bands, disks 22, shaft 20 and ratchet wheel 23 will be revolved owing to the frictional engagement between the brake bands and the peripheries of the disks, since ratchet teeth 39, moving in the direction of the arrow in Fig. 2, trail idly beneath the pawls 38, which are lifted in their seats as the ratchet teeth rotate beneath them.

On the return or upward movement of the vehicle body, there is a tendency to impart a movement of rotation in the opposite direction through the connections just described, to the brake bands, the disks 22 and the ratchet wheel 23, for some one of the pawls 36 which is in contact always with the face of the ratchet wheel will engage a ratchet tooth 39, locking the ratchet wheel 23, the shaft 20 and the disks 22 against rotation and frictional resistance will at once be set up between the locked disks 22 and the brake bands which will continue to rotate, the amount of friction depending, of course, on the area of the friction surfaces between the bands and the disks, and the tension of the tensioning spring 29 tending to draw the band tightly about the periphery of the disk, and this element of friction thus created will effectively retard the return of the body, preventing any sudden rebound but compelling an easy and retarded upward movement of the body.

With the connections between the vehicle body and the shock absorber shown in Fig. 5, the operation of the device is similar to that just described. With this structure, upon downward movement of the vehicle body, tension upon the straps 32 is relieved and the spring 34 revolves the disks 22 together with the brake bands, and the ratchet wheel 23 in a direction to rewrap the straps about the peripheries of the disks 22, but immediately upon return movement of the vehicle body, the straps 32 having been snugly wrapped upon the disks 22, and one of the ratchet teeth 39 having been brought into engagement with one of the pawls 38 to prevent rotation of the ratchet wheel together with the disk 22 in the opposite direction, the bands slip about the disks 22 and the friction between the bands and the disks retards the upward movement of the vehicle body, and the body moves into normal position with an easy and relatively slow movement.

The casing 13 is preferably closed tight, so as to provide a reservoir for oil, so that the various parts of the shock absorber may be maintained in a proper lubricated condition.

In order that the locking movement of the ratchet wheel and its associated disks 22 which effect retardation of the upward movement of the flexed spring may take place uniformly, it is desirable that the number of pawls and pawl partitions bear a certain ratio to the length of the ratchet tooth, and while the pawls and pawl partitions over the length of one tooth may be increased or diminished and be of odd or even number, the number of teeth over which the pawls operate may be varied, and the width of pawls and pawl partitions may be changed. I have in the present instance illustrated four teeth positioned beneath the pawls and three and one-half spaces over each tooth, the partitions 37 and the pawl-seats 36 being referred to, alike, as spaces.

With the arrangement here shown, the pawl seats and the pawl partitions are of the same or uniform width, and the relation which they bear to the length of the ratchet tooth is as three and one-half to one, namely, there are three and one-half spaces, that is, pawls and pawl partitions to each ratchet tooth, and in this embodiment the pawls and pawl spaces, which total fourteen in number, extend over four tooth lengths. With this arrangement, it will be seen that one of the ratchet teeth will engage one of the pawls upon a movement of the ratchet wheel equal to one-half of a space, that is one-half the width of the pawl or pawl partition. Thus upon the slightest flexing and return of the vehicle spring one ratchet tooth will engage one of the pawls and the retardation of the spring will be immediately effected.

Of course the arrangement of teeth and pawls may be varied as desired, and the amount of movement of the teeth before any one of them engages one of the ratchets to effect retardation of the spring depends on the number of teeth, the number of spaces covering the length of one tooth, and the width of the spaces.

It is, of course, obvious that my invention is susceptible of various other modifications and changes which would be within the spirit of the invention, without departing from the scope of the following claims.

What I claim is:—

1. In a shock absorber for spring supported vehicles, the combination with a casing, of a shaft mounted in the casing, a frictional disk mounted upon the shaft on the outside of said casing, a retarding member about the periphery of said disk, means for imparting a movement of rotation to said frictional disk and retarding member on movement of the vehicle body and flexure of the spring, and means within the casing to prevent rotation of said frictional disk on return movement of the vehicle body.

2. In a shock absorber for spring supported vehicles, the combination with a casing, of a shaft mounted in the casing, a frictional disk mounted upon the shaft on the outside of said casing, a brake band about the periphery of said disk, means for imparting a movement of rotation to said brake band and frictional disk on movement of the vehicle body and flexure of the spring, and means within the casing to prevent rotation of said frictional disk on return movement of the vehicle body.

3. In a shock absorber for spring supported vehicles, the combination with a casing, of a retarding member having a wheel within said casing, and a retarding element on the outside of the casing and rotatable with said wheel, a second retarding element encircling said retarding element of the first retarding member and rotatable therewith in both directions, means to impart a movement of rotation to said retarding members on movement of the vehicle body and flexure of the springs, and means within the casing for engaging said wheel to prevent rotation of the first retarding member upon return movement of the vehicle body.

4. In a shock absorber for spring supported vehicles, the combination with a casing, of a retarding member having rotating retarding elements without and on each side of said casing, retarding members encircling and in frictional engagement with each of said retarding elements of the first retarding member, means for varying the friction between said retarding members and elements, means to impart a movement of rotation to all of said retarding members on movement of the vehicle body and flexure of the spring, and means for preventing rotation of said first retarding member upon return movement of the vehicle body.

5. In a shock absorber for spring supported vehicles, the combination with a casing, of a shaft mounted in the casing, a ratchet wheel within the casing fixedly mounted on the shaft, a frictional disk fixedly mounted on said shaft on either side of said casing, a brake band about the peripheries of said disks, means for imparting a movement of rotation to said brake bands and frictional disks on movement of the vehicle body and flexure of the springs, and means within the casing adapted to engage said ratchet wheel to prevent rotation of said frictional disks on return movement of the vehicle body.

6. In a shock absorber for a spring supported vehicle, the combination with a casing, of a retarding member having a pair of disks upon the outside of the casing and a ratcheted element within said casing, a retarding member encircling and in frictional engagement with each of said disks and rotatable in both directions, means to impart a movement of rotation to all of said retarding members on movement of the vehicle body and flexure of the spring, means for engaging said ratcheted element to prevent rotation of said first retarding member, and means for varying the frictional engagement between said members.

7. In a shock absorber for spring supported vehicles, the combination with a casing, of a retarding member having a pair of disks upon the outside of said casing, and a ratchet wheel within said casing, a retarding member comprising a brake band in frictional engagement with each of said disks and rotatable in both directions, means to impart a movement of rotation to all of said retarding members on movement of the vehicle body and flexure of the springs, and a gravity pawl to engage said ratcheted wheel and prevent rotation thereof on return movement of the vehicle body.

8. In a shock absorber for spring supported vehicles, the combination with a casing, of a shaft, a ratchet wheel within the casing fixed to said shaft, a friction disk without the casing and also fixed to said shaft, a retarding element encircling and in engagement with said disk and rotatable in both directions, means to impart a movement of rotation to said retarding member and disk on movement of the vehicle body and flexure of the springs, and a series of pawls slidably mounted in said casing any one of which may engage said ratchet wheel.

9. In a shock absorber for spring supported vehicles, the combination with a casing, of a shaft mounted in the casing, a ratchet wheel within said casing fixedly mounted on said shaft, a frictional disk mounted upon the shaft on either side of said casing, a brake band about the peripheries of said disks, means for imparting a movement of rotation thereto and said frictional disks on movement of the vehicle body and flexure of the spring, and pawls within the casing any one of which is adapted to engage said ratchet wheel to prevent rotation of said frictional disk on return movement of the vehicle body.

10. In a shock absorber for spring supported vehicles, the combination with a casing, of a shaft mounted in the casing, a ratchet wheel within said casing fixedly mounted on said shaft, a frictional disk mounted on the shaft on either side of said casing, a brake band about the peripheries of said disks, means for imparting a movement of rotation thereto and said frictional disks on movement of the vehicle body and flexure of the spring, pawls within the casing any one of which is adapted to engage said ratchet wheel to prevent rotation of said frictional disk on return movement of the vehicle body, and a connection between the brake bands and a relatively movable part of the vehicle for imparting a movement of rotation to said brake bands on return movement of the vehicle body.

In testimony whereof I have hereunto set my hand in presence of two subscribing witnesses.

WILLIAM O. GILBERT.

Witnesses:
 IRENE M. HIGBEE,
 T. J. NOLAN.